US009922039B1

(12) United States Patent
Armangau et al.

(10) Patent No.: US 9,922,039 B1
(45) Date of Patent: Mar. 20, 2018

(54) TECHNIQUES FOR MITIGATING EFFECTS OF SMALL UNALIGNED WRITES

(71) Applicant: EMC Corporation, Hopkinton, MA (US)

(72) Inventors: Philippe Armangau, Acton, MA (US); Christopher A. Seibel, Walpole, MA (US); Ahsan Rashid, Edison, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/086,758

(22) Filed: Mar. 31, 2016

(51) Int. Cl.
  *G06F 12/00* (2006.01)
  *G06F 13/00* (2006.01)
  (Continued)

(52) U.S. Cl.
  CPC ........ *G06F 17/30138* (2013.01); *G06F 3/064* (2013.01); *G06F 3/0611* (2013.01);
  (Continued)

(58) Field of Classification Search
  CPC ........ G06F 3/06; G06F 3/0601; G06F 3/0602; G06F 3/0604; G06F 3/0608; G06F 3/061; G06F 3/0611; G06F 3/0613; G06F 3/0628; G06F 3/0638; G06F 3/064; G06F 3/0641; G06F 3/0643; G06F 3/0644; G06F 3/0646; G06F 3/0647; G06F 3/0649; G06F 3/065; G06F 3/0652; G06F 3/0653; G06F 3/0655; G06F 3/0656; G06F 3/0658; G06F 3/0659; G06F 3/0661; G06F 3/0662; G06F 3/0664; G06F 3/0665; G06F 3/0667;
  (Continued)

(56) References Cited

U.S. PATENT DOCUMENTS 5,410,682 A * 4/1995 Sites ................... G06F 9/30018
                                                                 712/223
7,111,147 B1 * 9/2006 Strange ................. G06F 3/0607
                                                                 711/114
(Continued)

OTHER PUBLICATIONS

The Design and Implementation of an Efficient Data Consistency Mechanism for In-Memory File Systems; Chen et al; 13th International Conference on Embedded Software and Systems; Aug. 13-14, 2016; pp. 170-175 (6 pages) (Year: 2016).*

(Continued)

*Primary Examiner* — Daniel C Chappell
(74) *Attorney, Agent, or Firm* — BainwoodHuang (57) ABSTRACT

Embodiments are directed to techniques for allowing write operations to proceed on units smaller than a block. Merely decreasing the block size is not desirable, however, since many files are written in large chunks at once, and larger block sizes can increase speed and decrease the amount of overhead metadata required. Therefore, in order to maintain large block sizes while still obtaining the benefit of being able to make small writes when necessary, blocks may be divided into sub-blocks. Unaligned writes that do not fill up an entire block may be segregated and stored separately from aligned writes, the unaligned writes having finer granularity. These techniques may result in faster operation for unaligned writes. They also especially benefit systems using compression because they allow efficiently partially overwriting compressed blocks.

17 Claims, 7 Drawing Sheets

(51) Int. Cl.
*G06F 13/28* (2006.01)
*G06F 17/30* (2006.01)
*G06F 3/06* (2006.01)

(52) U.S. Cl.
CPC .......... G06F 3/0643 (2013.01); G06F 3/0659 (2013.01); G06F 3/0683 (2013.01); G06F 17/30088 (2013.01)

(58) Field of Classification Search
CPC ...... G06F 3/0668; G06F 3/067; G06F 3/0671; G06F 3/0673; G06F 3/0674; G06F 3/0676; G06F 3/0677; G06F 3/0679; G06F 3/068; G06F 3/0682; G06F 3/0683; G06F 9/38–9/3897; G06F 12/0223; G06F 12/023; G06F 12/0238; G06F 12/0246; G06F 12/0284; G06F 12/0292; G06F 12/04; G06F 12/06; G06F 17/30; G06F 17/30067; G06F 17/3007; G06F 17/30073; G06F 17/30076; G06F 17/30079; G06F 17/30082; G06F 17/30085; G06F 17/30088; G06F 17/30091; G06F 17/30094; G06F 17/30097; G06F 17/301; G06F 17/30103; G06F 17/30106; G06F 17/30109; G06F 17/30112; G06F 17/30129; G06F 17/30138; G06F 17/30182; G06F 2003/0691; G06F 2003/0692; G06F 2003/0694; G06F 2003/0695; G06F 2003/0697; G06F 2003/0698; G06F 2206/00–2206/1014; G06F 2212/00–2212/7211; G06F 3/0685; G06F 3/0686; G06F 3/0688; G06F 3/0689
See application file for complete search history.

(56) References Cited

U.S. PATENT DOCUMENTS

| | | | | |
|---|---|---|---|---|
| 7,249,227 B1* | 7/2007 | Pittman | ................. | G06F 3/0611 711/154 |
| 7,506,111 B1* | 3/2009 | Hamilton | .............. | G06F 3/0605 707/999.1 |
| 7,631,155 B1* | 12/2009 | Bono | .................... | G06F 3/0608 707/999.202 |
| 7,685,178 B2* | 3/2010 | Rajan | .................... | G06F 3/0607 707/802 |
| 7,739,312 B2* | 6/2010 | Gordon | ................. | G06F 3/0608 707/802 |
| 7,870,356 B1* | 1/2011 | Veeraswamy | ......... | G06F 3/0607 711/100 |
| 7,962,689 B1* | 6/2011 | Kazar | ..................... | G06F 3/061 711/100 |
| 8,204,871 B1* | 6/2012 | Pawar | ............... | G06F 17/30132 707/639 |
| 8,407,265 B1* | 3/2013 | Scheer | ............. | G06F 17/30138 707/823 |
| 8,615,500 B1* | 12/2013 | Armangau | ........ | G06F 17/30156 382/232 |
| 8,799,601 B1* | 8/2014 | Chen | .................... | G06F 3/0608 711/161 |
| 8,868,520 B1* | 10/2014 | Raghuwanshi | ... | G06F 17/30156 707/692 |
| 8,903,877 B1* | 12/2014 | Vempati | ................ | G06F 3/0611 707/828 |
| 8,924,631 B2* | 12/2014 | Ng | ...................... | G06F 12/0246 711/103 |
| 8,938,425 B1* | 1/2015 | Armangau | ........ | G06F 17/30165 707/639 |
| 9,043,530 B1* | 5/2015 | Sundaram | ............... | G06F 3/068 711/100 |
| 9,135,123 B1* | 9/2015 | Armangau | .......... | G06F 11/1471 |
| 9,256,614 B1* | 2/2016 | Bono | ............... | G06F 17/30088 |
| 9,256,629 B1* | 2/2016 | Bono | ............... | G06F 17/30197 |
| 9,529,707 B2* | 12/2016 | Nakamura | ............ | G06F 3/0611 |
| 2010/0057755 A1* | 3/2010 | Schneider | ......... | G06F 17/30067 707/E17.01 |
| 2012/0131286 A1* | 5/2012 | Faith | .................... | G06F 3/0613 711/154 |
| 2013/0073784 A1* | 3/2013 | Ng | ...................... | G06F 12/0246 711/103 |
| 2015/0347030 A1* | 12/2015 | Mathur | ................. | G06F 3/0611 711/118 |

OTHER PUBLICATIONS

PLFS: a checkpoint filesystem for parallel applications; Bent et al; Proceedings of the Conference on High Performance Computing Networking, Storage and Analysis; Nov. 14-20, 2009 (12 pages) (Year: 2009).*
Using MPI file caching to improve parallel write performance for large-scale scientific applications; Liao et al; Proceedings of the 2007 ACM/IEEE Conference on Supercomputing; Nov. 10-16, 2007 (11 pages) (Year: 2007).*
Scaling parallel I/O performance through I/O delegate and caching system; Nisar et al; Proceedings of the 2008 ACM/IEEE Conference on Supercomputing; Nov. 15-21, 2008 (12 pages) (Year: 2008).*

* cited by examiner

TECHNIQUES FOR MITIGATING EFFECTS OF SMALL UNALIGNED WRITES

BACKGROUND

Data storage systems (DSSes) store large quantities of data logically arranged onto many logical disks accessible to host devices. Host devices send data storage commands to a DSS in order for the DSS to access its storage and fulfill the data storage commands with respect to a logical disk. When a host device sends a write command as a data storage command directed at the DSS, the DSS writes data from the command to a block of a logical disk.

In some DSSes, logical disks are arranged as files on a filesystem internal to the DSS, allowing the logical disks to be provisioned with storage on-the-fly. This arrangement also allows for easy snapshotting of a logical disk at a given moment in time by sharing blocks between a primary filesystem file and various snapshot files.

SUMMARY

Unfortunately, when there are holes in the data being written within storage commands, inefficiencies may result. For example, if data is only being written to half of a block, storage interconnect bandwidth may be wasted sending the entire block to disk. In addition, whenever the block needs to be copied (e.g., on a write split for a snapshot), time may be wasted zeroing the holes of the target. In addition, when using compression, if only a small portion of a block needs to be updated, the entire block as well as other blocks with which it was compressed, must be read, decompressed, modified, re-compressed, and re-written back to disk.

Thus, it would be desirable to allow write operations to proceed on units smaller than a block. Merely decreasing the block size is not desirable, however, since many files are written in large chunks at once, and larger block sizes can increase speed and decrease the amount of overhead metadata required. Therefore, in order to maintain large block sizes while still obtaining the benefit of being able to make small writes when necessary, blocks may be divided into sub-blocks. Unaligned writes that do not fill up an entire block may be segregated and stored separately from aligned writes, the unaligned writes having finer granularity. These techniques may result in faster operation for unaligned writes. They also especially benefit systems using compression because they allow efficiently partially overwriting compressed blocks.

In one embodiment, a computer-implemented method is performed by a computing device. The method includes (a) receiving, by the computing device, a set of block write commands, each block write command directing the computing device to write to a set of addresses of a logical volume (LV) stored on a container filesystem (CFS) of persistent storage of the computing device, (b) for a first subset of the set of block write commands, determining that the block write commands of the first subset each direct the computing device to write to at least a threshold number of logical sub-blocks of a respective logical block of the LV, each logical block being divided into a predefined number of equal-sized logical sub-blocks, each logical sub-block having a contiguous logical address range within the LV, (c) for a second subset of the set of block write commands, determining that the block write commands of the second subset each direct the computing device to write to fewer than the threshold number of logical sub-blocks of a respective logical block, (d) for each block write command of the first subset, (1) inserting a block pointer in a set of metadata of a first file of the CFS, the first file representing the LV, the set of metadata of the first file having offsets that represent logical blocks of the LV and (2) writing data of that block write command to a block in a first region of the CFS pointed to by the inserted block pointer, and (e) for each block write command of the second subset, (1) inserting a set of sub-block pointers in a set of metadata of a second file of the CFS, the second file also representing the LV, the set of metadata of the second file having offsets that represent logical sub-blocks of the LV and (2) writing data of that block write command to a set of sub-blocks in a second region of the CFS pointed to by the inserted set of sub-block pointers, the second region being separate from the first region. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for allowing write operations to proceed on units smaller than a block. Merely decreasing the block size is not desirable, however, since many files are written in large chunks at once, and larger block sizes can increase speed and decrease the amount of overhead metadata required. Therefore, in order to maintain large block sizes while still obtaining the benefit of being able to make small writes when necessary, blocks may be divided into sub-blocks. Unaligned writes that do not fill up an entire block may be segregated and stored separately from aligned writes, the unaligned writes having finer granularity. These techniques may result in faster operation for unaligned writes. They also especially benefit systems using compression because they allow efficiently partially overwriting compressed blocks.

Figure 1:
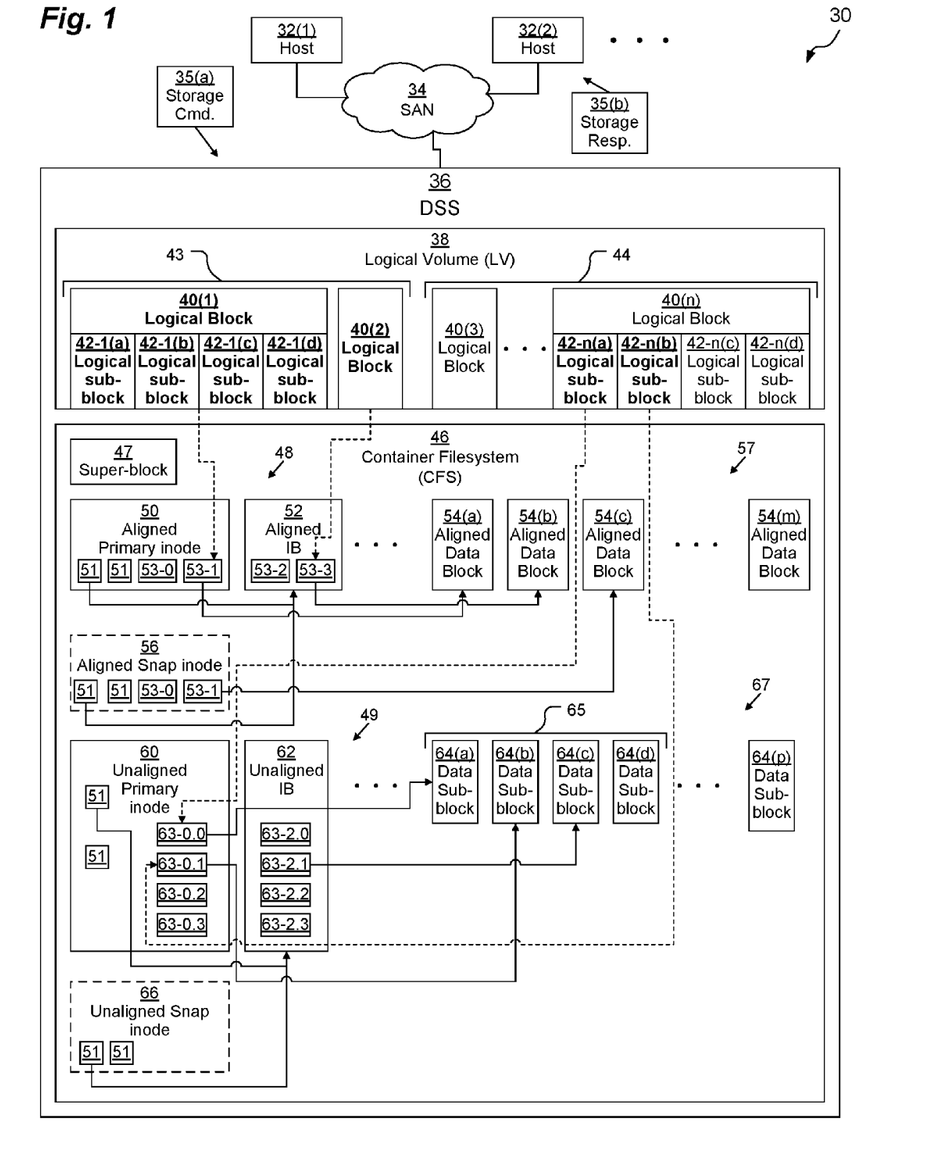
FIG. 1 is a block diagram depicting an example system and apparatus for use in connection with various embodiments.

FIG. 1 depicts a system 30. System 30 includes a set of hosts 32 (depicted as hosts 32(1), 32(2), . . . ) that communicate with a data storage system (DSS) 36 over a network, such as storage area network (SAN) 34.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Hosts 32 issue data storage commands 35(a) and receive data storage responses 35(b) from the DSS 36 in order to read from and write to storage.

DSS 36 may be any kind of computing device, such as, for example, a personal computer, workstation, server computer, enterprise server, laptop computer, tablet computer, smart phone, mobile computer, etc. or combinations thereof. Typically, a DSS 36 is a cabinet-mounted device having two or more storage processors (not depicted) configured to access persistent storage. In a typical arrangement, a storage processor is configured as a board or enclosure mounted within a rack connected to persistent storage also mounted within the rack. These components, in combination, may make up DSS 36. Further detail with respect to the hardware of DSS 36 is provided below in connection with FIG. 2.

A logical layout of DSS 36 is depicted within FIG. 1. A logical volume (LV) 38 includes a plurality of logical blocks 40 (depicted as logical blocks 40(1), 40(2), 40(3), . . . , 40(n)) in which data of the LV 38 are stored. LV 38 is typically accessible to one or more hosts 32 as a disk.

Each logical block 40 may be logically divided into a set of logical sub-blocks 42 (for example, logical block 40(1) is shown divided into logical sub-blocks 42-1(a), 42-1(b), 42-1(c), 42-1(d), and logical block 40(n) is shown divided into logical sub-blocks 42-n(a), 42-n(b), 42-n(c), 42-n(d)). In any given embodiment, there is a fixed size of each logical block 40 and a fixed size of each logical sub-block 42 (meaning that there are a fixed number of logical sub-blocks 42 per logical block 40).

In a typical embodiment, the size of a logical block 40 is 8 kilobytes, although that is by way of example only. In other embodiments, a logical block 40 may be 4, 16, 32, or even 64 kilobytes, for example.

There are a whole integer number of logical sub-blocks 42 per logical block 40, and that whole integer is at least two. Typical values for the size of a logical sub-block 42 given an 8-kilobyte logical block 40 are 512 bytes, 1 kilobyte, 2 kilobytes, and 4 kilobytes. For simplicity, each logical block 40 is shown being divided into four logical sub-blocks 42, corresponding to an embodiment in which the size of a logical block 40 is 8 kilobytes and the size of a logical sub-block 42 is 2 kilobytes.

Each logical sub-block 42 is contiguous. Thus, the first 2048 bytes of logical block 40(1) are in logical sub-block 42-1(a), the second 2048 bytes of logical block 40(1) are in logical sub-block 42-1(b), the third 2048 bytes of logical block 40(1) are in logical sub-block 42-1(c), and the last 2048 bytes of logical block 40(1) are in logical sub-block 42-1(d).

The logical blocks 40 of LV 38 may be logically divided into two sets 43, 44. Aligned set 43 includes all logical blocks 40 (e.g., 40(1), 40(2)) which contain data in all of their respective constituent logical sub-blocks 42. These logical blocks 40(1), 40(2) are marked in bold. The logical sub-blocks 42-1(a-d), 42-n(a), 42-n(b) having data therein are also marked in bold. Unaligned set 44 includes all logical blocks 40 (e.g., 40(3), 40(n)) which do not contain data in all of their respective constituent logical sub-blocks 42. Thus, although logical sub-blocks 42-n(a), 42-n(b) contain data therein, logical sub-blocks 42-n(c), 42-n(d) do not contain data, so logical block 40(n) is within unaligned set 44.

The individual logical blocks 40 and logical sub-blocks 42 of LV 38 are backed by a container filesystem (CFS) 46. CFS 46 contains a super-block 47 as well as metadata 48, 49 and data storage regions 57, 67. Metadata 48, 49 includes inodes 50, 56, 60, 66 as well as indirect blocks (IBs) 52, 62. Logically, CFS 46 includes a primary aligned file, which is represented by aligned primary inode 50, aligned IB 52, and aligned data blocks 54(a), 54(b). CFS 46 also includes a primary unaligned file, which is represented by unaligned primary inode 60, unaligned IB 62, and unaligned data sub-blocks 64(a), 64(b), 64(c). The primary aligned file and the primary unaligned file in combination store the data of LV 38.

In some embodiments, CFS 46 also includes one or more snapshots of LV 38, the snapshots being stored on respective snapshot aligned files and snapshot unaligned files. As depicted, one example snapshot aligned file is made up of aligned snapshot inode 56, aligned IB 52 (which, in this example, it shares with the primary aligned file), and aligned data blocks 54(b), 54(c) (also sharing aligned data block 54(b) with the primary aligned file). As depicted, one example snapshot unaligned file is made up of unaligned snapshot inode 66, unaligned IB 62 (which, in this example, it shares with the primary unaligned file), and unaligned data sub-blocks 64(a), 64(b), 64(c) (also shared with the primary unaligned file).

Aligned data region 57 includes a set of aligned data blocks 54 (depicted as aligned data blocks 54(a), 54(b), 54(c), . . . , 54(m)). Each aligned data block 54 is the same size as a logical block 40 (e.g., 8 kilobytes).

Unaligned data region 67 includes a set of sub-blocks 64 (depicted as sub-blocks 64(a), 64(b), 64(c), 64(d), . . . , 64(p)). Each sub-block 64 is the same size as a logical sub-block 42 (e.g., 2 kilobytes). As depicted, four consecutive sub-blocks 64(a-d) make up an unaligned data block 65, for example.

Each inode 50, 56, 60, 66 may include one or more IB pointers 51. The aligned inodes 50, 56 also each contain one or more block pointers 53, which may point to respective aligned data blocks 54 of the file represented by the respective inode 50, 56 (although in the case of compression, this pointer relationship is a bit more complex, as is well-known in the art). Each aligned IB 52 contains either a set of block pointers 53 or a set of additional IB pointers 51 as is well-known in the art. In one embodiment, each block pointer 53 and each IB pointer 51 is a 64-bit (8-byte) pointer, and each aligned IB 52 is a full block size of 8-kilobytes, meaning that there are 1024 IB pointers 51 or block pointers 53 per aligned IB 52.

In a typical arrangement, each aligned inode 50, 56 includes three IB pointers 51 and fifteen block pointers 53 (although, as depicted, for simplicity, each inode 50, 56 includes only two block pointers 53 and two IB pointers 51). The offset position of each block pointer 53 within the inode 50, 56 and hierarchy of aligned IBs 52 defines the address within the file represented by that inode 50, 56 of the aligned data block 54 that is pointed to. Thus, as depicted, within aligned primary inode 50, block pointer 53-0 at offset 0 represents addresses 0 through 8191 (bytes) of LV 38, block pointer 53-1 at offset 1 represents addresses 8192 through 16,383 (bytes) of LV 38, block pointer 53-2 at offset 2 represents addresses 16,384 through 24,575 (bytes) of LV 38, and block pointer 53-3 at offset 3 represents addresses 24,576 through 32,767 (bytes) of LV 38. As depicted, however, block pointer 53-0 at offset 0 is null, not pointing to any aligned data block 54. This is because addresses 0 through 2047 (bytes) of LV 38 are, in this example, represented by an unaligned logical block 40 (e.g., logical block 40(n)). Thus, the relevant data for addresses 0 through 8191

(bytes) of LV 38 is stored within data sub-blocks 64 pointed to by unaligned primary inode 60.

The unaligned inodes 60, 66 each contain one or more sub-block pointers 63, which may point to respective data sub-blocks 64 of the file represented by the respective inode 60, 66 (although in the case of compression, this pointer relationship is a bit more complex, as is well-known in the art). Each unaligned IB 62 contains either a set of sub-block pointers 63 or a set of additional IB pointers 51 as is well-known in the art.

Each unaligned IB 62 contains either a set of sub-block pointers 63 or a set of additional IB pointers 51 as is well-known in the art. In one embodiment, each sub-block pointer 63 and each IB pointer 51 is a 64-bit (8-byte) pointer, and each unaligned IB 62 is a full block size of 8-kilobytes, meaning that there are 1024 IB pointers 51 or sub-block pointers 63 per unaligned IB 62. In another embodiment (not depicted), each sub-block pointer 63 may instead include one 64-bit (8-byte) unaligned block 65 pointer as well as one 64-bit (8-byte) bitmap to indicate which data sub-block 64 within the unaligned block 65 is being indicated; in these embodiments, an 8-kilobyte unaligned IB 62 only includes 512 sub-block pointers 63 rather than 1024.

As depicted, each unaligned inode 60, 66 includes two IB pointers 51 and four sub-block pointers 63. The offset position of each sub-block pointer 63 within the inode 60, 66 and hierarchy of unaligned IBs 62 defines the address within the file represented by that inode 60, 66 of the unaligned data sub-block 64 that is pointed to. Thus, as depicted, within unaligned primary inode 60, sub-block pointer 63-0.0 at offset 0 represents addresses 0 through 2047 (bytes) of LV 38, sub-block pointer 63-0.1 at offset 1 represents addresses 2048 through 4095 (bytes) of LV 38, sub-block pointer 63-0.2 at offset 2 represents addresses 4096 through 6143 (bytes) of LV 38, and sub-block pointer 63-0.3 at offset 3 represents addresses 6144 through 8191 (bytes) of LV 38. As depicted, sub-block pointer 63-0.0 at offset 0 points to data sub-block 64(*a*), and sub-block pointer 63-0.1 at offset 1 points to data sub-block 64(*b*). However, sub-block pointers 63-0.2 at offset 2 and 63-0.3 at offset 3 are both null, not pointing to any data sub-blocks 64. This is because addresses 4096 through 8191 (bytes) of LV 38 are, in this example, devoid of any data (i.e., a hole).

Similarly, block pointer 53-2 at offset 2 is also null, not pointing to any aligned data block 54. This is because addresses 16,384 through 24,575 (bytes) of LV 38 are, in this example, represented by an unaligned Logical block 40. Thus, the relevant data for addresses 16,384 through 24,575 (bytes) of LV 38 is stored within data sub-blocks 64 pointed to by unaligned IB 62. As depicted, sub-block pointer 63-2.1 points to data sub-block 64(*c*), but sub-block pointers 63-2.0, 63-2.2, and 63-2.3 are all null, not pointing to any data sub-blocks 64. This is because addresses 16,384 through 18,431 and 20,480 through 24,575 (bytes) of LV 38 are, in this example, devoid of any data (i.e., holes).

Generally speaking, both the metadata 48 of aligned primary file (i.e., aligned primary inode 50 and its associated aligned IBs 52) and the metadata 49 of unaligned primary file (i.e., unaligned primary inode 60 and its associated unaligned IBs 62) map the same address space within the LV 38, but because each data sub-block 64 is four times smaller than each aligned data block 54, the maximum number of sub-block pointers 63 possible within metadata 49 is four times greater than the maximum number of block pointers 53 possible within metadata 48.

In some embodiments (not depicted), it is possible for a block pointer 53 (e.g., block pointer 53-*x*) within metadata 48 to point to an aligned data block 54 while a sub-block pointer 63 (e.g., sub-block pointer 63-*x*.2) that corresponds to an address range that falls within the address range of the block pointer 53-*x* also points to a data sub-block 63. In that situation, the data within the data sub-block 63 would be overlaid over the data within the aligned data block 54, replacing a portion of that data. This is especially useful when compression is in use, so a portion of a compressed logical block 40 may be overwritten by writing a particular logical sub-block 42 within that logical block 40 without the need to read, de-compress, modify, re-compress, and re-write the entire logical block 40 (as well as any other logical blocks 40 compressed together with it).

Figure 2:
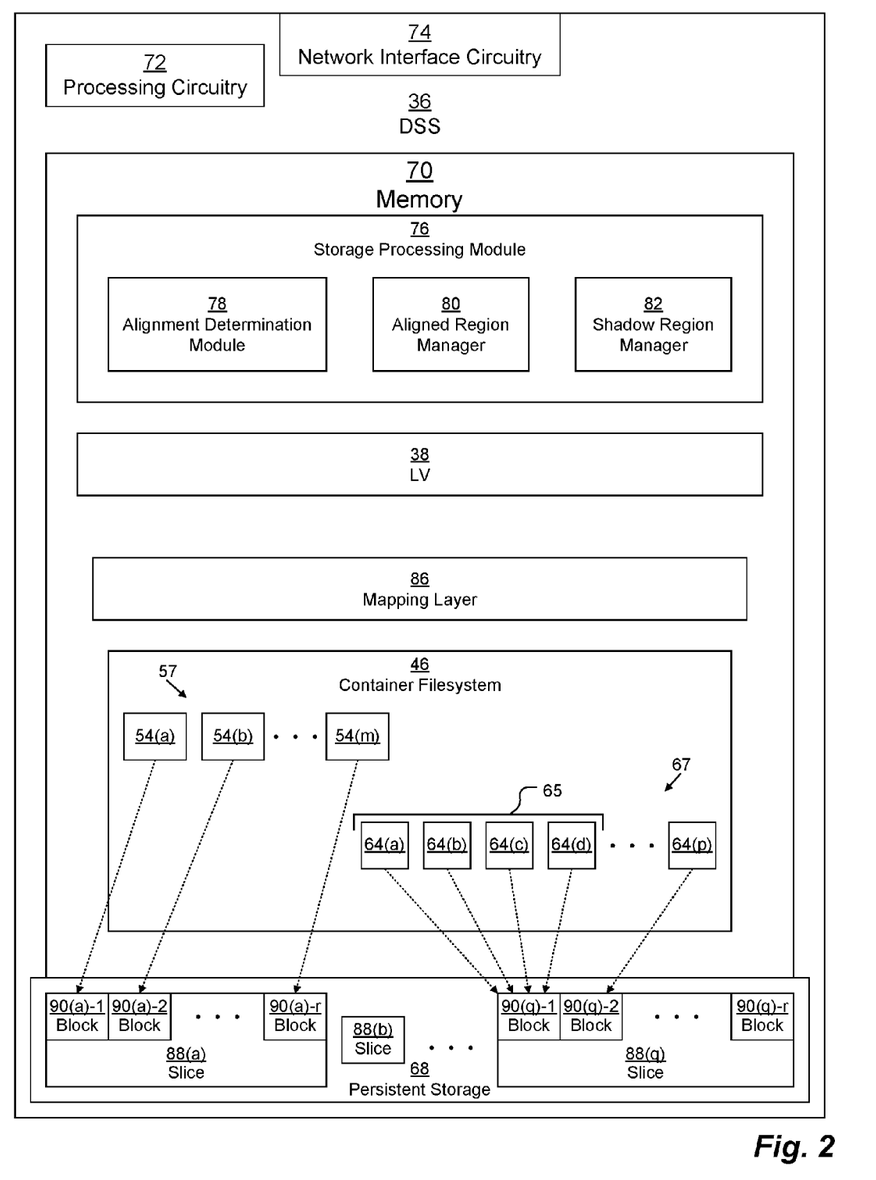
FIG. 2 is a block diagram depicting an example apparatus for use in connection with various embodiments.

FIG. 2 depicts the DSS 36 in further detail.

DSS 36 is a computing device, having persistent storage 68, memory 70, processing circuitry 72, and network interface circuitry 74.

Processing circuitry 72 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 74 may include one or more Ethernet cards, cellular modems, Fibre Channel (FC) adapters, Wireless Fidelity (Wi-Fi) wireless networking adapters, and other devices for connecting to a network, such as a SAN 34, local area network (LAN), wide area network (WAN), cellular data network, etc. Network interface circuitry 74 is able to communicate with hosts 32. In operation, hosts 32 send data storage commands 35(*a*) to DSS 36 in order to read from and write to persistent storage 68.

Persistent storage 68 may include one or more of any kind of storage device (not depicted) able to persistently store data, such as, for example, a magnetic hard disk drive, a solid state storage device (SSD), etc. Persistent storage 68 may be arranged as a plurality of RAID groups (not depicted), each made up of one or more storage devices, which may logically combine to create a logical disk (not depicted) having larger size or redundancy features or both, depending on the RAID level, as is well-known in the art. In some embodiments, each logical disk is partitioned into one or more slices 88 (depicted as slices 88(*a*), 88(*b*), . . . , 88(*q*)). The slices 88 from all logical disks thus forms a pool of slices 88 available for allocation to CFSes 46 within memory 70. The size of a slice 88 may vary, but in one embodiment, a slice is 256 megabytes, while in another embodiment, a slice is 1 gigabyte. Each slice 88 includes r blocks 90. Thus, for example, slice 88(*a*) is depicted as including blocks 90(*a*)-1, 90(*a*)-2, . . . , 90(*a*)-r and slice 88(*q*) is depicted as including blocks 90(*q*)-1, 90(*q*)-2, . . . , 90(*q*)-r. If, for example, a slice is 256 megabytes and a block 90 is 8 kilobytes, then r would be equal to 32,768 or possibly a bit less if there is some overhead space.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 72 (e.g., storage management module 76 and its component modules 78, 80, 82) as well as data used by those applications, such as in-memory representations of LV 38 and CFS 46. Mapping layer 86 maps blocks 40 of the LV 38 to particular aligned blocks 54 (within region 57) and sub-blocks 64 (within region 67) of CFS 46.

Each aligned block 54 within region 57 is backed by a physical block 90 from persistent storage 68. Thus, as depicted, aligned block 54(*a*) is backed by block 90(*a*)-1, aligned block 54(*b*) is backed by block 90(*a*)-2, and aligned block 54(*m*) is backed by block 90(*a*)-r.

Each unaligned block 65 within region 57 is also backed by a physical block 90 from persistent storage 68. Thus, as depicted, unaligned block 65 is backed by block 90(*q*)-1. In more detail, sub-blocks 64(*a*), 64(*b*), 64(*c*), and 64(*d*) are all backed by block 90(*q*)-1 at different offsets within that block 90(*q*)-1. As depicted, sub-block 64(*p*) is depicted by block 90(*q*)-2.

Storage processing module 76 is configured to allow data storage commands 35(*a*) to be performed on the LV 38 and logical volume 84. Storage processing module 76 includes an alignment determination module 78, an aligned region manager 80, and a shadow region manager 82. Alignment determination module 78 is configured to determine whether any given write command is directed to aligned region 57 or unaligned region 67 (also referred to as shadow region 67). Aligned region manager 80 is configured to manage storage operations within aligned region 57. Shadow region manager 82 is configured to manage storage operations within unaligned/shadow region 67.

In some embodiments, memory 70 may also include a persistent storage portion (not depicted). Persistent storage portion of memory 48 may be made up of one or more persistent storage devices, such as, for example, hard disk drives, solid-state storage devices, flash drives, etc. Persistent storage of memory 70 is configured to store programs and data even while the DSS 36 is powered off. The OS (e.g., Linux, UNIX, Windows, or a similar operating system) and the applications (e.g., modules 76, 78, 80, 82, 86) are typically stored in persistent storage (either persistent storage of memory 70 or persistent storage 68) so that they may be loaded into a system portion of memory 70 from persistent storage upon a system restart. These applications, when stored in non-transient form either in the volatile portion of memory 70 or in persistent storage, form a computer program product. The processing circuitry 72 running one or more of these applications thus forms a specialized circuit constructed and arranged to carry out the various processes described herein.

Figure 3:
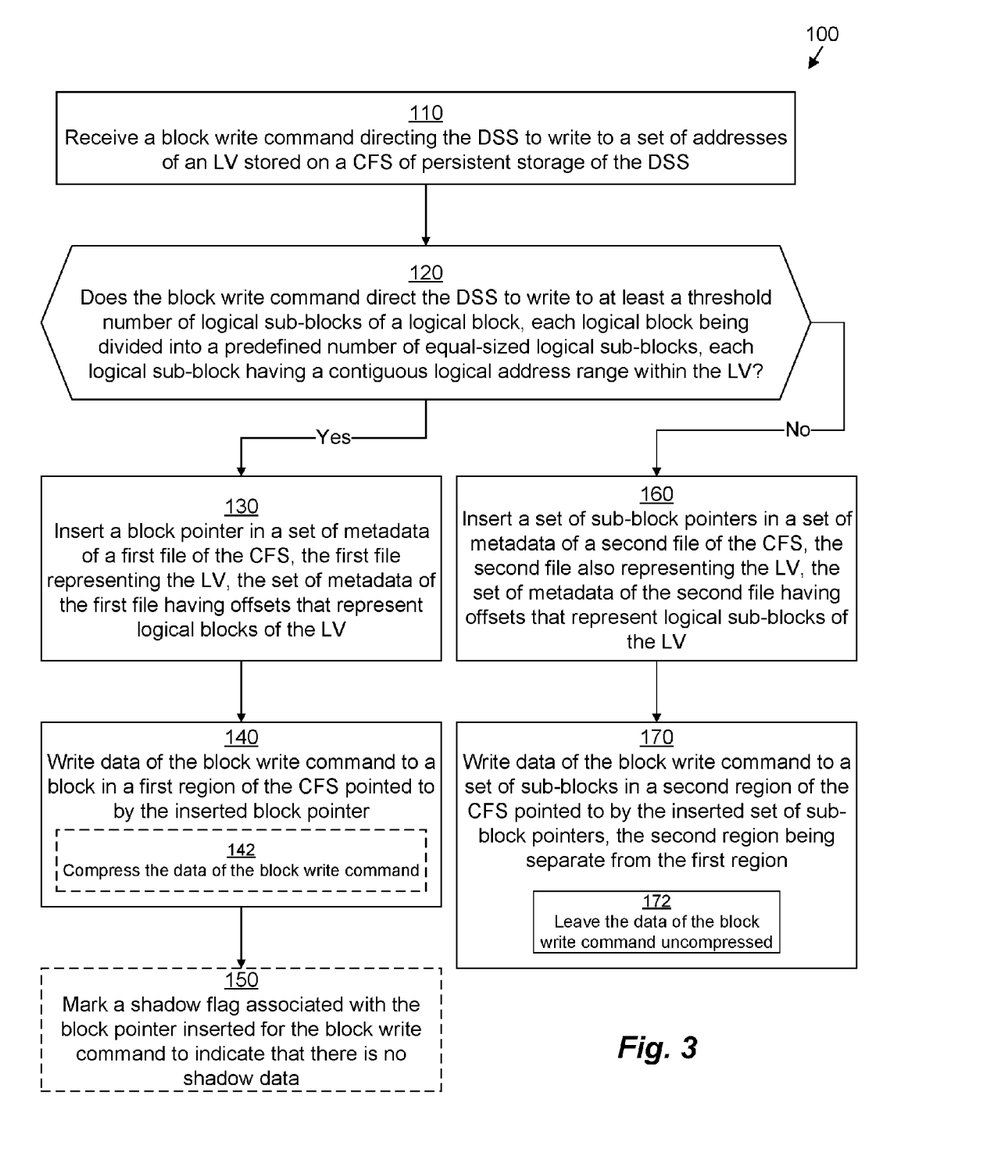
FIG. 3 is a flowchart depicting an example method for use in conjunction with various embodiments.

FIG. 3 illustrates an example method 100 performed by DSS 36. It should be understood that any time a piece of software (e.g., storage processing module 76, alignment determination module 78, aligned region manager 80, shadow region manager 82, mapping layer 86, etc.) is described as performing a method, process, step, or function, in actuality what is meant is that a computing device (e.g., DSS 36) on which that piece of software is running performs the method, process, step, or function when executing that piece of software on its processing circuitry 72.

It should be understood that, within FIG. 3, various steps and sub-steps are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order. Method 100 is performed by DSS 36, more specifically by its processing circuitry 72 in conjunction with various other system components.

In step 110, storage processing module 76 receives, via the network interface circuitry 74 (e.g., from a host 32), a block write command directing the DSS 36 to write data to a set of addresses of a LV 38 stored on a logical volume 84 backed by persistent storage 68 of the DSS 36. It should be understood that, although block write commands commonly indicate writes to several logical blocks 40 at once, within this document, it is assumed that all block write commands received from a host 32 are logically divided into block write commands that address each logical block 40 separately.

In step 120, alignment determination module 78 determines whether or not the block write command directs the DSS 36 to write to at least a threshold number of logical sub-blocks 42 of a logical block 40, each logical block 40 being divided into a predefined number of equal-sized sub-blocks 42, each sub-block 42 having a contiguous LV address range. For example, if the size of a block 40 is 8 kilobytes and the predefined number is four, then the size of a sub-block is 2 kilobytes. The threshold number may be any integer less than or equal to the predefined number, depending on the embodiment. Thus, since the predefined number is four, the threshold number may be, for example, four or three.

If the result of step 120 is affirmative, then operation proceeds with step 130. Otherwise, if the result of step 120 is negative, operation proceeds with step 160.

In step 130, aligned region manager 80 inserts a block pointer 53 in a set of metadata 48 of a first (aligned) file of the CFS 46, the first file representing the LV 38, the set of metadata 48 of the first file having offsets that represent particular logical blocks 40 within LV 38.

In step 140, aligned region manager 80 writes data of the block write command to a block 54 in a first (aligned) region 57 of the CFS 46 pointed to by the inserted block pointer 53. In some embodiments, writing the data to the aligned block 54 includes first compressing the data (optional sub-step 142), while in other embodiments, the data is written to aligned block 54 without compression.

In optional step 150, aligned region manager 80 marks a shadow flag (see shadow flag 92 in FIG. 7) associated with the block pointer 53 inserted for the block write command to indicate that there is no shadow data in unaligned region 67 to be overlaid over the data in aligned block 54. Overlaying of data sub-blocks 64 over aligned data blocks 54 may be done in various embodiments, but it is particularly helpful when compression is used in the aligned region 57. Optional step 150 and the use of the shadow flag 92 speed read operations while slowing write operations compared to not using a shadow flag 92 even while permitting overlaying.

It should be understood that method 100 is described primarily in the context of a write to a logical block 40 that has not been written to before. Therefore, even in embodiments in which step 150 is omitted (i.e., the shadow flag 92 is not used), strictly-speaking, it is not necessary to remove sub-block pointers 63 for addresses that correspond to the block pointer 53 inserted in step 130, since no such sub-block pointers 63 were ever inserted. However, if method 100 is performed in the context of a write to a logical block 40 that has previously been written to, then in embodiments in which step 150 is omitted, aligned region manager 80 should instead remove any sub-block pointers 63 for addresses that correspond to the block pointer 53 inserted in step 130. In addition, in some embodiments, even if method 100 is only performed in connection with a write to a new logical block 40, aligned region manager 80 may actively remove any stray sub-block pointers 63 for addresses that correspond to the block pointer 53 inserted in step 130 when step 150 is omitted (for example, to avoid a problem of improperly-initialized sub-block pointers 63). See step 350 below, in connection with FIG. 5.

In step 160, shadow region manager 82 inserts a set of sub-block pointers 63 in a set of metadata 49 of a second (unaligned) file of the CFS 46, the second file also representing the LV 38, the set of metadata 49 of the second file having offsets that represent logical sub-blocks 42 of the LV 38.

In step 170, shadow region manager 82 writes data of the block write command to a set of sub-blocks 64 in a second (unaligned) region 67 of CFS 46 pointed to by the inserted set of sub-block pointers 63, the second region 67 being separate from the first region 57. Writing the data to the data sub-blocks 64 includes leaving the data uncompressed (sub-step 172).

Figure 4:
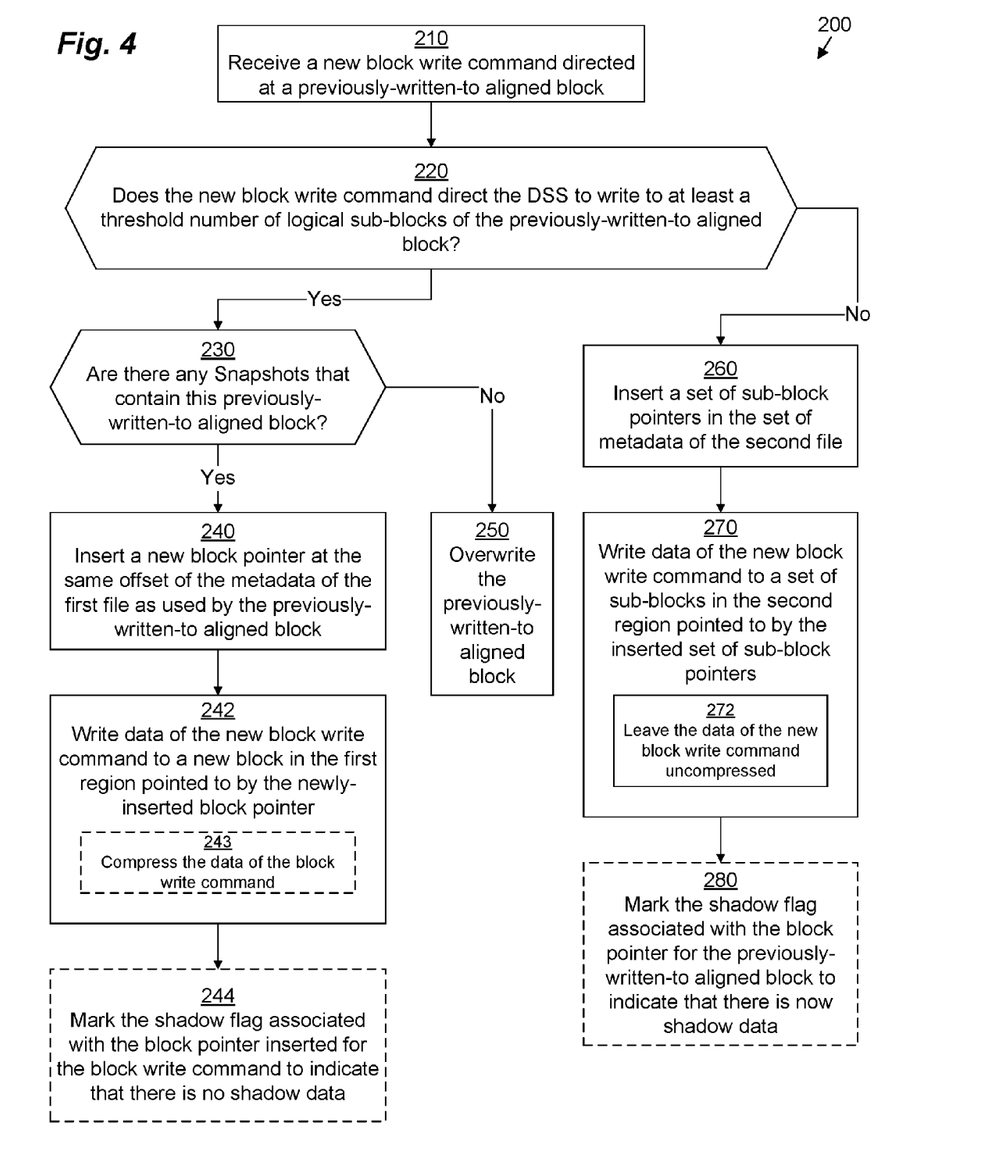
FIG. 4 is a flowchart depicting an example method for use in conjunction with various embodiments.

FIG. 4 depicts another method 200 performed by DSS 36 after method 100. It should be understood that, in some embodiments, one or more of the steps or sub-steps in FIG. 4 may be omitted. Similarly, in some embodiments, one or more steps or sub-steps may be combined together or performed in a different order. Method 200 is performed by DSS 36, more specifically by its processing circuitry 72 in conjunction with various other system components.

In step 210, storage processing module 76 receives, via the network interface circuitry 74 (e.g., from a host 32), a new block write command directing the DSS 36 to write data to a logical block 40 that was previously written-to (e.g., in method 100) and backed by an aligned data block 54 (e.g., in steps 130-150).

In step 220, alignment determination module 78 determines whether or not the new block write command directs the DSS 36 to write to at least a threshold number of logical sub-blocks 42 of the previously-written-to logical block 40. If the result of step 220 is affirmative, then operation proceeds with step 230. Otherwise, if the result of step 220 is negative, operation proceeds with step 260.

In step 230, aligned region manager 80 determines whether or not there are any snapshots that contain the block being written to. In particular, aligned region manager 80 determines whether or not there is any aligned snap inode 56 or any aligned IB 52 within an aligned snapshot hierarchy (but not within the aligned primary hierarchy) that includes a pointer 53 that points to the aligned data block 54 that was previously written-to. If the result of step 230 is affirmative, then operation proceeds with step 240. Otherwise, if the result of step 230 is negative, operation proceeds with step 250.

In step 240, since the aligned data block 54 that was previously written-to is also pointed to by a snapshot, there is now a write split, so the aligned data block 54 that was previously written-to must be preserved. Thus, in step 240, aligned region manager 80 inserts a new block pointer 53 at the same offset of the metadata 48 of the first file as used by the previously-written-to aligned data block 54. At this point aligned region manager 80 may need to make a copy of an aligned IB 52 so that the snapshot can maintain an old version of that aligned IB 52 if it does not already have its own version as is well-known in the art.

In step 242, aligned region manager 80 writes data of the new block write command to a new aligned data block 54 in the aligned region 57 pointed to by the newly-inserted block pointer 53. In some embodiments, writing the data to the new aligned block 54 includes first compressing the data (optional sub-step 243), while in other embodiments, the data is written to new aligned block 54 without compression.

In optional step 244, aligned region manager 80 marks a shadow flag 92 associated with the block pointer 53 to indicate that there is no shadow data in unaligned region 67 to be overlaid over the data in new aligned block 54.

It should be understood that method 200 is described primarily in the context of a write to a logical block 40 that has only previously been written to with aligned data. Therefore, even in embodiments in which step 244 is omitted (i.e., the shadow flag 92 is not used), strictly-speaking, it is not necessary to remove sub-block pointers 63 for addresses that correspond to the block pointer 53 inserted in step 240, since no such sub-block pointers 63 were ever inserted. However, if method 200 is performed in the context of a write to a logical block 40 that has previously had any unaligned writes thereon, then in embodiments in which step 244 is omitted, aligned region manager 80 should instead remove any sub-block pointers 63 for addresses that correspond to the block pointer 53 inserted in step 240. In addition, in some embodiments, even if method 200 is only performed in connection with logical blocks 40 that have only previously been written to with aligned data, aligned region manager 80 may actively remove any stray sub-block pointers 63 for addresses that correspond to the block pointer 53 inserted in step 240 when step 244 is omitted (for example, to avoid a problem of improperly-initialized sub-block pointers 63). See step 350 below, in connection with FIG. 5.

In step 250, since the aligned data block 54 that was previously written-to is not pointed to by any snapshot, there is no write split, so the aligned data block 54 that was previously written-to may simply be over-written with new data, without the need to allocate a new unaligned data block 54. Thus, in step 250, aligned region manager 80 overwrites the aligned data block 54 that was previously written-to with the data of the new block write command.

It should be understood that method 200 is described primarily in the context of a write to a logical block 40 that has only previously been written to with aligned data. Therefore, strictly-speaking, step 250 may be performed without need to remove sub-block pointers 63 for addresses that correspond to the block pointer 53 that points to the aligned data block 54 that is being over-written, since no such sub-block pointers 63 were ever inserted. However, if method 200 is performed in the context of a write to a logical block 40 that has previously had any unaligned writes thereon, then aligned region manager 80 should also remove any sub-block pointers 63 for addresses that correspond to the block pointer 53 that points to the aligned data block 54 that is being over-written in step 250 at this point. In addition, in some embodiments, even if method 200 is only performed in connection with logical blocks 40 that have only previously been written to with aligned data, aligned region manager 80 may actively remove any stray sub-block pointers 63 for addresses that correspond to the block pointer 53 that points to the aligned data block 54 that is being over-written in step 250 at this point (for example, to avoid a problem of improperly-initialized sub-block pointers 63). See step 350 below, in connection with FIG. 5.

In step 260, shadow region manager 82 inserts a set of sub-block pointers 63 in the set of metadata 49 of the second file representing the LV 38, the set of metadata 49 of the second file having offsets that represent logical sub-blocks 42 of the LV 38. The sub-block pointers 63 that are added are those that correspond to the particular logical sub-blocks 42 that are written to within the new block write command.

In step 270, shadow region manager 82 writes the data of the new block write command to a set of data sub-blocks 64 in unaligned region 67 of CFS 46 pointed to by the inserted set of sub-block pointers 63. Writing the data to the data sub-blocks 64 includes leaving the data uncompressed (sub-step 272).

In optional step 280, shadow region manager 82 marks a shadow flag 92 associated with the block pointer 53 to the aligned block 54 that was previously written-to in order to indicate that there is now shadow data in unaligned region 67 to be overlaid over the data in the aligned block 54.

Figure 5:
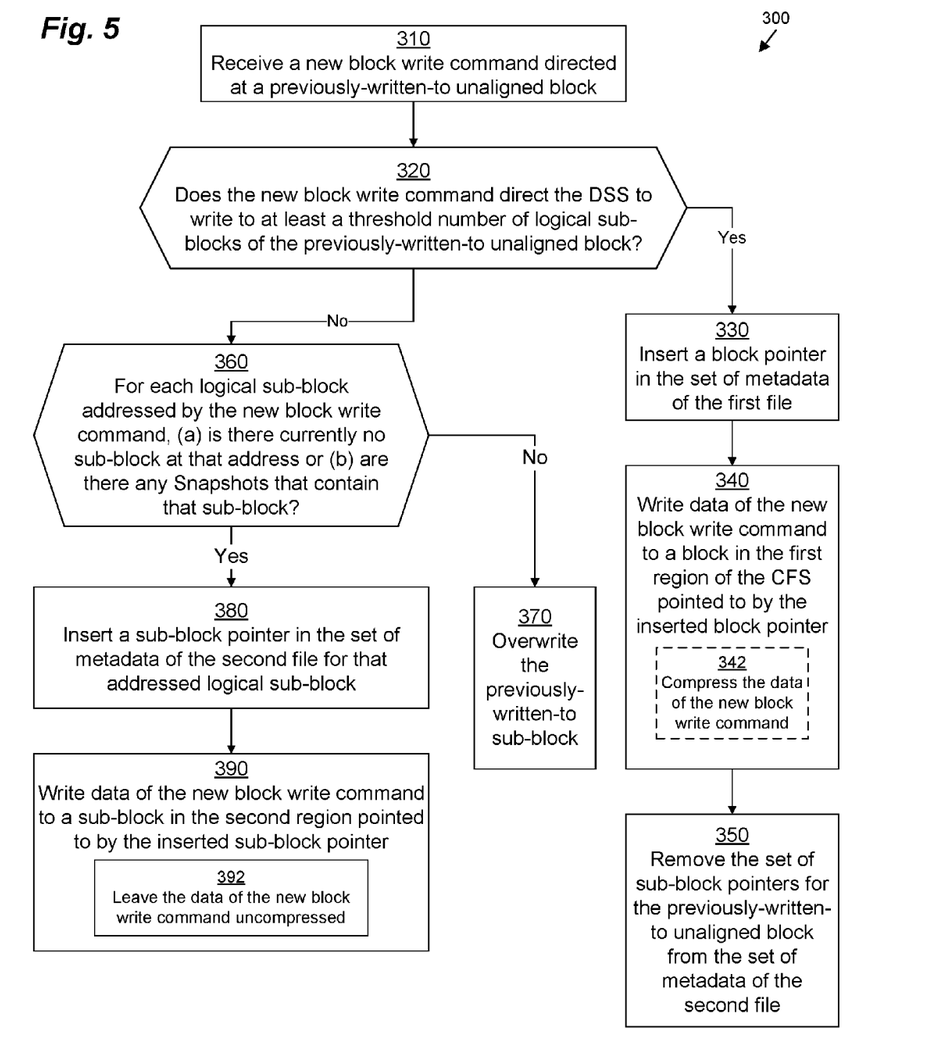
FIG. 5 is a flowchart depicting an example method for use in conjunction with various embodiments.

FIG. 5 depicts another method 300 performed by DSS 36 after method 100. It should be understood that, within FIG. 5, one sub-step is dashed because it may be optional and not fundamental to method 300. However, it should be understood that, in some embodiments, one or more of the other steps or sub-steps may also be omitted. Similarly, in some embodiments, one or more steps or sub-steps may be combined together or performed in a different order. Method 300 is performed by DSS 36, more specifically by its processing circuitry 72 in conjunction with various other system components.

In step 310, storage processing module 76 receives, via the network interface circuitry 74 (e.g., from a host 32), a new block write command directing the DSS 36 to write data to a logical block 40 that was previously written-to (e.g., in method 100) and backed by unaligned data sub-blocks 64 (e.g., in steps 160-170).

In step 320, alignment determination module 78 determines whether or not the new block write command directs the DSS 36 to write to at least a threshold number of logical sub-blocks 42 of the previously-written-to logical block 40 (which was backed by data sub-blocks 64). If the result of step 320 is affirmative, then operation proceeds with step 330. Otherwise, if the result of step 320 is negative, operation proceeds with step 360.

In step 330, since the new block write command writes to all (or most) of the logical block 40 that was previously backed by data sub-blocks 64, a new aligned data block 54 must be allocated and pointed to. Thus, in step 330, aligned region manager 80 inserts a new block pointer 53 at an offset of the metadata 48 of the first file that corresponds to the address within LV 38 of the logical block 40 that is being written to.

In step 340, aligned region manager 80 writes data of the new block write command to a new aligned data block 54 in the aligned region 57 pointed to by the newly-inserted block pointer 53. In some embodiments, writing the data to the new aligned block 54 includes first compressing the data (optional sub-step 342), while in other embodiments, the data is written to the new aligned data block 54 without compression.

In step 350, aligned region manager 80 removes (or sets to null or some other invalid value) the sub-block pointers 63 with offsets that correspond to the same address range within the LV 38 as the logical block 40 that is being written to (i.e., the same sub-block pointers 63 that were previously inserted in step 160). This is dome so that the data within the data sub-blocks 64 pointed to by those block pointers 63 is not overlaid over the data in the aligned data block 54 that was just written to (see step 340) upon a read occurring (see below in connection with FIGS. 6A and 6B).

In steps 360-395, since the new block write command writes to only part of the logical block 40 that was previously backed by data sub-blocks 64, shadow region manager 82 updates metadata and/or data within shadow region 67 for each logical sub-block 42 being written to.

In step 360, shadow region manager 82 determines if both of two conditions hold for each logical sub-block 42 that is being written to. Condition (a) requires that there is currently no data sub-block 64 being pointed to by a pointer 63 at an offset within unaligned primary inode 60 or any of its unaligned IBs 62 that correspond to that particular logical sub-block 42. Condition (b) requires that there are currently no snapshots that contain the sub-block being written to. In particular, shadow region manager 82 determines whether there is any unaligned snap inode 66 or any unaligned IB 62 within an unaligned snapshot hierarchy that includes a pointer 63 that points to the data sub-block 64 that is being written-to. If the result of step 330 is affirmative on both conditions, then operation proceeds with step 380. Otherwise, if the result of step 3 is negative on either condition, operation proceeds with step 370.

In step 370, since there is already a pointer 63 at an appropriate offset within unaligned primary inode 60 and the sub-block 64 that it points to is not part of any snapshot, shadow region manager 82 can simply over-write that sub-block 64 with new data from the new block write command corresponding to the address of the logical sub-block 42.

In steps 380-395, since there is either no valid pointer 63 at an appropriate offset within unaligned primary inode 60 or the sub-block 64 that it points to is part of a snapshot, shadow region manager 82 must take a more complex approach. Thus, in step 380, shadow region manager 82 inserts a sub-block pointer 63 at an offset of the set of metadata 49 of the second file that represents the address of the logical sub-block 42 being written to. If there is a snapshot, then shadow region manager 82 may need to make a copy of an unaligned IB 62 so that the snapshot can maintain an old version of that unaligned IB 52 if it does not already have its own version as is well-known in the art.

In step 390, shadow region manager 82 writes the data of the new block write command to the data sub-block 64 in unaligned region 67 of CFS 46 pointed to by the inserted sub-block pointer 63. Writing the data to the data sub-blocks 64 includes leaving the data uncompressed (sub-step 392).

Figure 6A:
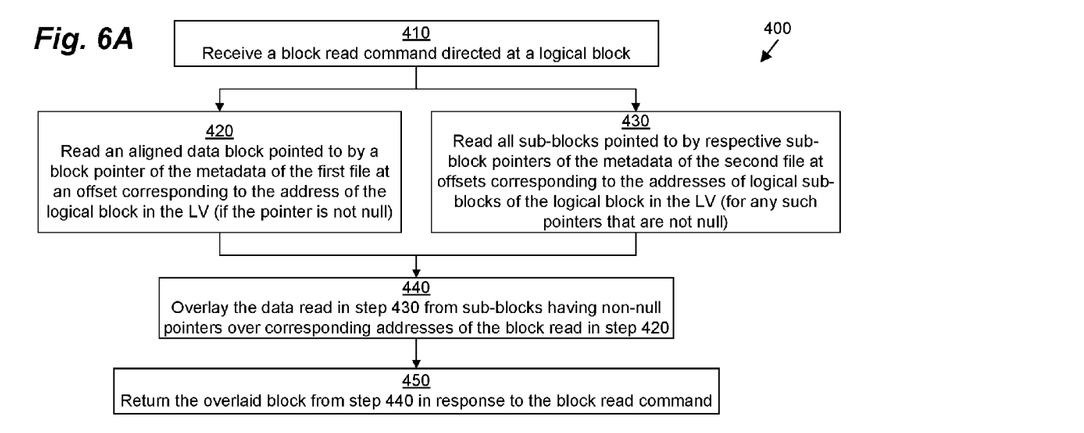
FIG. 6A is a flowchart depicting an example method for use in conjunction with various embodiments.

FIG. 6A depicts another method 400 performed by DSS 36 after method 100. It should be understood that, in some embodiments, one or more steps may be combined together or performed in a different order. Method 400 is performed by DSS 36, more specifically by its processing circuitry 72 in conjunction with various other system components.

FIG. 6A represents a read in an embodiment in which overlaying is used but there are no shadow flags 92 used.

In step 410, storage processing module 76 receives, via the network interface circuitry 74 (e.g., from a host 32), a block read command directing the DSS 36 to read data from a logical block 40 that was previously written-to (e.g., in method 100).

In response, steps 420 and 430 are performed in parallel.

In step 420, aligned region manager 80 reads an aligned data block 54 pointed to by a block pointer 53 of the metadata 48 of the first file at an offset corresponding to the address of the logical block 40 in the LV 38. However, if the block pointer 53 is null or otherwise invalid, step 420 is skipped.

In step 430, shadow region manager 82 reads all data sub-blocks 64 pointed to by respective sub-block pointers 63 (which are not null or otherwise invalid) of the metadata 49 of the second file at offsets corresponding to the addresses of logical sub-blocks 42 of the logical block 40 in the LV 38.

Then, in step 440, storage processing module 76 overlays the data read in step 430 from sub-blocks 64 having non-null sub-block pointers 63 pointing to them over corresponding addresses of the aligned data block 54 read in step 420.

Finally, in step 450, storage processing module 76 returns the overlaid block from step 430 as part of a storage response 35(*b*) in response to the read command.

FIG. 6A depicts another method 400 performed by DSS 36 after method 100. It should be understood that, in some embodiments, one or more steps may be combined together or performed in a different order. Method 400 is performed by DSS 36, more specifically by its processing circuitry 72 in conjunction with various other system components.

Figure 6B:
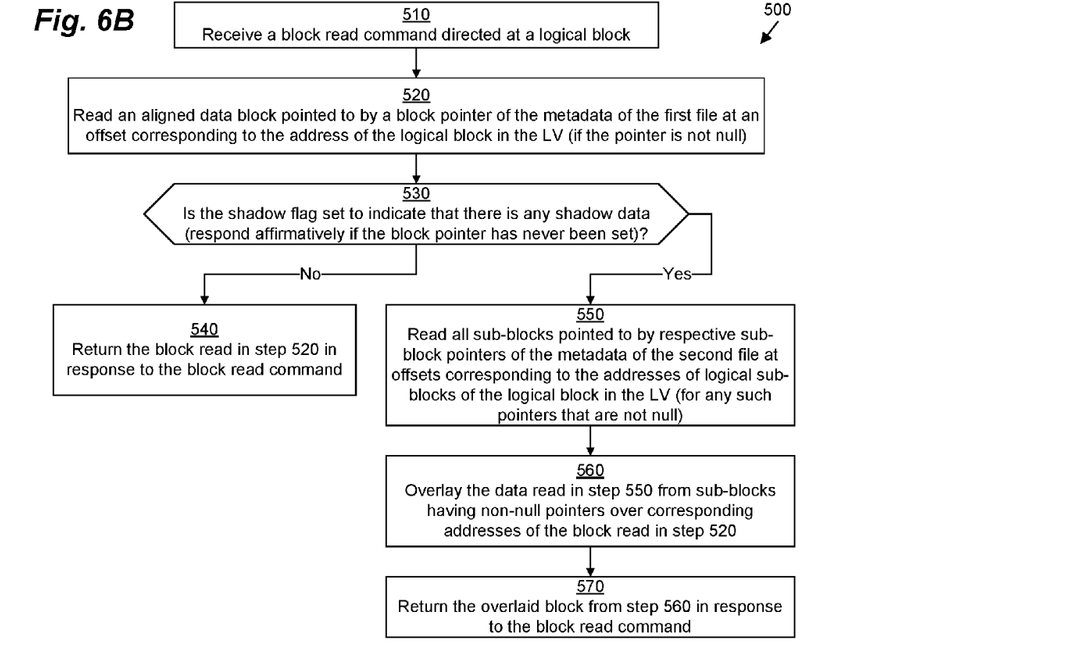
FIG. 6B is a flowchart depicting an example method for use in conjunction with various embodiments.

FIG. 6B represents a read in an embodiment in which there are shadow flags 92 used in conjunction with overlaying In step 510, storage processing module 76 receives, via the network interface circuitry 74 (e.g., from a host 32), a block read command directing the DSS 36 to read data from a logical block 40 that was previously written-to (e.g., in method 100).

In response, in step 520, aligned region manager 80 reads an aligned data block 54 pointed to by a block pointer 53 of the metadata 48 of the first file at an offset corresponding to the address of the logical block 40 in the LV 38. However, if the block pointer 53 is null or otherwise invalid, step 520 is skipped.

In step 530, alignment determination module 78 determines if the shadow flag 92 associated with the appropriate block pointer 53 is set to indicate that there is any shadow data. Since, it is possible for there to be data in shadow region 67 even if there has not been anything written to aligned region 57 yet, alignment determination module 78 yields an affirmative result if the block pointer has never even been initially set. If the result of step 530 is affirmative, then operation proceeds with step 550. Otherwise, if the result of step 530 is negative, operation proceeds with step 540.

In step 540, storage processing module 76 returns aligned data block 54 read in step 520 as part of a storage response 35(*b*) in response to the read command.

In step 550, shadow region manager 82 reads all data sub-blocks 64 pointed to by respective sub-block pointers 63 (which are not null or otherwise invalid) of the metadata 49 of the second file at offsets corresponding to the addresses of logical sub-blocks 42 of the logical block 40 in the LV 38.

Then, in step 560, storage processing module 76 overlays the data read in step 550 from sub-blocks 64 having non-null sub-block pointers 63 pointing to them over corresponding addresses of the aligned data block 54 read in step 520.

Finally, in step 570, storage processing module 76 returns the overlaid block from step 560 as part of a storage response 35(*b*) in response to the read command.

Figure 7:
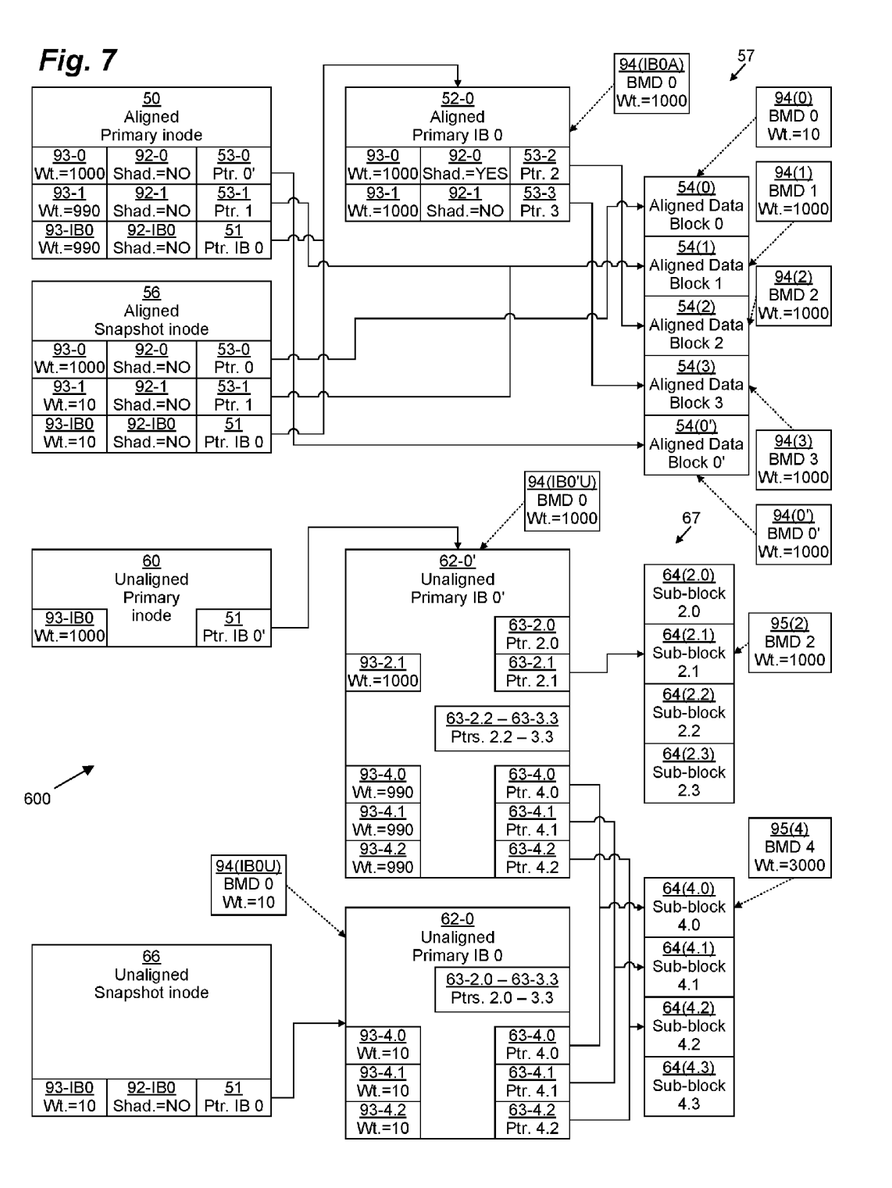
FIG. 7 is a block diagram depicting an example arrangement of data for use in conjunction with various embodiments.

FIG. 7 depicts an example arrangement 600 of data structures within CFS 46 in the context of operation of an embodiment in which snapshots are utilized. It should be understood that general principles by which weights 93 are used in the context of snapshots are described in detail in U.S. Pat. No. 8,032,498 entitled "DELEGATED REFERENCE COUNT BASE FILE VERSIONING," issued on Oct. 4, 2011, the entire contents and teachings of which are incorporated herein by this reference. That reference may be viewed as describing operation of snapshotting in a system that only utilizes an aligned file with no unaligned file.

Just as total weights are maintained within block metadata (BMD) 94 for each aligned block 54 and IB 52, 62, total weights are also maintained within block metadata 95 for each unaligned block 65 (see FIG. 1) of sub-blocks 64. For example, as depicted, within unaligned primary IB 62-0', even though sub-block pointer 63-2.1 points to data sub-block 64(2.1) while neighboring sub-block pointers 63-2.0, 63-2.2, and 63-2.3 (the latter two of which are grouped together for space reasons) are all null (or otherwise invalid), sub-block 64(2.1) does not exist on its own; it is part of an unaligned data block 65 (see FIG. 1), which in this case also contains sub-blocks 64(2.0), 64(2.2), and 64(2.3).

Sub-block 64(2.1) has a total weight of 1000, since the one sub-block pointer 63-2.1 that points to it has an associated weight 93-2.1 of 1000. Because no sub-block pointers 63 point to sub-blocks 64(2.0), 64(2.2), and 64(2.3), those all have total weights of zero. Thus, the combined total weight of all of the sub-blocks 64(2.0), 64(2.1), 64(2.2), and 64(2.3) is 0+1000+0+0=1000, which is stored within block metadata 95(2) for the unaligned block 65 that contains sub-blocks 64(2.0), 64(2.1), 64(2.2), and 64(2.3).

In addition, although a shadow flag 92 may be maintained in aligned inodes 50, 56 and aligned IBs 52, no such shadow flag 92 is stored in unaligned inodes 60, 66 and unaligned IBs 62.

Thus, techniques for allowing write operations to proceed on units smaller than a block 40 have been provided. In order to maintain large block sizes while still obtaining the benefit of being able to make small writes when necessary, blocks 40 may be divided into sub-blocks 42. Unaligned writes that do not fill up an entire block 40 may be segregated and stored separately from aligned writes, the unaligned writes having finer granularity. These techniques may result in faster operation for unaligned writes. They also especially benefit systems using compression because they allow efficiently partially overwriting compressed blocks.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a computing device, the method comprising:
   receiving, by the computing device, a set of block write commands, each block write command directing the computing device to write to a set of addresses of a logical volume (LV) stored on a container filesystem (CFS) of persistent storage of the computing device;
   for a first subset of the set of block write commands, determining that the block write commands of the first subset each direct the computing device to write to at least a threshold number of logical sub-blocks of a respective logical block of the LV, each logical block being divided into a predefined number of equal-sized logical sub-blocks, each logical sub-block having a contiguous logical address range within the LV;

for a second subset of the set of block write commands, determining that the block write commands of the second subset each direct the computing device to write to fewer than the threshold number of logical sub-blocks of a respective logical block;

for each block write command of the first subset:
  inserting a block pointer in a set of metadata of a first file of the CFS, the first file representing the LV, the set of metadata of the first file having offsets that represent logical blocks of the LV; and
  writing data of that block write command of the first subset to a block in a first region of the CFS pointed to by the inserted block pointer; and for each block write command of the second subset:
  inserting a set of sub-block pointers in a set of metadata of a second file of the CFS, the second file also representing the LV, the set of metadata of the second file having offsets that represent logical sub-blocks of the LV; and
  writing data of that block write command of the second subset to a set of sub-blocks in a second region of the CFS pointed to by the inserted set of sub-block pointers, the second region being separate from the first region;

wherein the first file and the second file both represent the LV such that any logical byte address within the LV may be represented within an offset of both the first file and the second file.

2. The method of claim 1 wherein:
writing data of that block write command to the block pointed to by the inserted block pointer for each block write command of the first subset includes compressing the data of that block write command prior to writing to the block pointed to by the inserted block pointer; and
writing data of that block write command to the set of sub-blocks pointed to by the inserted set of sub-block pointers for each block write command of the second subset includes writing uncompressed data to the set of sub-blocks pointed to by the inserted set of sub-block pointers.

3. The method of claim 2 wherein the method further comprises:
subsequently, receiving a new block write command directing the computing device to write to at least the threshold number of logical sub-blocks of a logical block previously-written-to by a block write command of the second subset; and
in response to receiving the new block write command:
  inserting a new block pointer in the set of metadata of the first file, the new block pointer corresponding to the logical block previously-written-to;
  writing compressed data of the new block write command to a block in a first region of the CFS pointed to by the inserted new block pointer; and
  removing, from the set of metadata of the second file, the set of sub-block pointers for the logical block previously-written-to.

4. The method of claim 1 wherein the method further comprises:
subsequently, receiving a new block write command directing the computing device to write to fewer than the threshold number of logical sub-blocks of a logical block previously-written-to by a block write command of the first subset; and
in response to receiving the new block write command:
  inserting a new set of sub-block pointers in the set of metadata of the second file, the new set of sub-block pointers corresponding to the fewer than the threshold number of logical sub-blocks of the logical block previously-written-to; and
  writing data of the new block write command to a new set of sub-blocks in the second region pointed to by the inserted new set of sub-block pointers.

5. The method of claim 4 wherein:
inserting the block pointer in the set of metadata of the first file for each block write command of the first subset includes, marking, in the set of metadata of the first file, a shadow flag associated with the block pointer inserted for that block write command to indicate that there is no shadow data; and
the method further comprises:
  in response to receiving the new block write command, changing, in the set of metadata of the first file, the shadow flag associated with the block pointer inserted for the logical block previously-written-to, to indicate that there is now shadow data for that logical block;
  subsequently, receiving a block read command directing the computing device to read the logical block previously-written-to; and
  in response to receiving the block read command:
    reading the block in the first region of the CFS pointed to by the block pointer inserted for the logical block previously-written-to;
    reading the shadow flag associated with the block pointer inserted for the logical block previously-written-to, indicating that there is shadow data for that logical block;
    in response to reading the shadow flag indicating that there is shadow data for that logical block, reading sub-blocks pointed to by the inserted new set of sub-block pointers in the set of metadata of the second file; and
    overlaying the read sub-blocks over the block read from the first region.

6. The method of claim 4 wherein the method further comprises:
subsequently, receiving a block read command directing the computing device to read the logical block previously-written-to; and
in response to receiving the block read command:
  reading the block in the first region of the CFS pointed to by the block pointer inserted for the logical block previously-written-to;
  reading sub-blocks pointed to by the inserted new set of sub-block pointers in the set of metadata of the second file; and
  overlaying the read sub-blocks over the block read from the first region.

7. The method of claim 1 wherein the method further comprises:
subsequently, receiving a new block write command directing the computing device to write to at least the threshold number of logical sub-blocks of a logical block previously-written-to by a block write command of the second subset; and
in response to receiving the new block write command:
  inserting a new block pointer in the set of metadata of the first file, the new block pointer corresponding to the logical block previously-written-to;

writing data of the new block write command to a block in a first region of the CFS pointed to by the inserted new block pointer; and removing, from the set of metadata of the second file, the set of sub-block pointers for the logical block previously-written-to.

8. The method of claim 1 wherein the method further comprises:

subsequently, receiving a new block write command directing the computing device to write to at least the threshold number of logical sub-blocks of a logical block previously-written-to by a block write command of the first subset; and in response to receiving the new block write command, writing data of the new block write command to a block in the first region of the CFS pointed to by a block pointer corresponding to the logical block previously-written-to.

9. The method of claim 1 wherein the method further comprises:

subsequently, receiving a new block write command directing the computing device to write to a logical sub-block of a logical block previously-written-to by a block write command of the second subset;

checking whether executing the new block write command would cause the number of sub-blocks of the block previously-written-to to at least equal the threshold number; and in response to checking, selectively performing a de-shadowing operation if checking yields an affirmative answer, wherein performing the de-shadowing operation includes:

inserting a new block pointer in the set of metadata of the first file, the new block pointer corresponding to the block previously-written-to;

copying data from the set of sub-blocks in the second region of the CFS pointed to by the sub-block pointers of the block previously-written-to to a block in the first region of the CFS pointed to by the inserted new block pointer;

writing data of the new block write command to the block in the first region of the CFS pointed to by the inserted new block pointer; and removing, from the set of metadata of the second file, the set of sub-block pointers for the block previously-written-to.

10. The method of claim 1 wherein:
each block is 8 kilobytes in size; and
each sub-block is 512 bytes in size, the predefined number being 16.

11. The method of claim 1 wherein:
each block is 8 kilobytes in size; and
each sub-block is 2048 bytes in size, the predefined number being 4.

12. The method of claim 1 wherein:
each block is 8 kilobytes in size; and
each sub-block is 4096 bytes in size, the predefined number being 2.

13. The method of claim 1 wherein the threshold number is equal to the predefined number.

14. The method of claim 1 wherein the threshold number is less than the predefined number.

15. A computer program product comprising a non-transitory computer-readable storage medium storing a set of instructions, which, when executed by a computing device, cause the computing device to:

receive a set of block write commands, each block write command directing the computing device to write to a set of addresses of a logical volume (LV) stored on a container filesystem (CFS) of persistent storage of the computing device;

for a first subset of the set of block write commands, determine that the block write commands of the first subset each direct the computing device to write to at least a threshold number of logical sub-blocks of a respective logical block of the LV, each logical block being divided into a predefined number of equal-sized logical sub-blocks, each logical sub-block having a contiguous logical address range within the LV;

for a second subset of the set of block write commands, determine that the block write commands of the second subset each direct the computing device to write to fewer than the threshold number of logical sub-blocks of a respective logical block;

for each block write command of the first subset:
insert a block pointer in a set of metadata of a first file of the CFS, the first file representing the LV, the set of metadata of the first file having offsets that represent logical blocks; and
write data of that block write command of the first subset to a block in a first region of the CFS pointed to by the inserted block pointer; and for each block write command of the second subset:
insert a set of sub-block pointers in a set of metadata of a second file of the CFS, the second file also representing the LV, the set of metadata of the second file having offsets that represent logical sub-blocks of the LV; and
write data of that block write command of the second subset to a set of sub-blocks in a second region of the CFS pointed to by the inserted set of sub-block pointers, the second region being separate from the first region;

wherein the first file and the second file both represent the LV such that any logical byte address within the LV may be represented within an offset of both the first file and the second file.

16. An apparatus comprising:
network interface circuitry connecting to a remote host;
persistent storage backing a container filesystem (CFS); and
processing circuitry coupled to memory, the processing circuitry being configured to:

receive a set of block write commands, each block write command directing the apparatus to write to a set of addresses of a logical volume (LV) stored on the CFS backed by persistent storage;

for a first subset of the set of block write commands, determine that the block write commands of the first subset each direct the apparatus to write to at least a threshold number of logical sub-blocks of a respective logical block of the LV, each logical block being divided into a predefined number of equal-sized logical sub-blocks, each logical sub-block having a contiguous logical address range within the LV;

for a second subset of the set of block write commands, determine that the block write commands of the second subset each direct the apparatus to write to fewer than the threshold number of logical sub-blocks of a respective logical block;

for each block write command of the first subset:
insert a block pointer in a set of metadata of a first file of the CFS, the first file representing the LV, the set of metadata of the first file having offsets that represent logical blocks of the LV; and write data of that block write command of the first subset to a block in a first region of the CFS pointed to by the inserted block pointer; and for each block write command of the second subset:

insert a set of sub-block pointers in a set of metadata of a second file of the CFS, the second file also representing the LV, the set of metadata of the second file having offsets that represent logical sub-blocks of the LV; and write data of that block write command of the second subset to a set of sub-blocks in a second region of the CFS pointed to by the inserted set of sub-block pointers, the second region being separate from the first region;

wherein the first file and the second file both represent the LV such that any logical byte address within the LV may be represented within an offset of both the first file and the second file.

17. A method performed by a computing device, the method comprising:

receiving, by the computing device, a set of block write commands, each block write command directing the computing device to write to a set of addresses of a logical volume (LV) stored on a container filesystem (CFS) of persistent storage of the computing device;

for a first subset of the set of block write commands, determining that the block write commands of the first subset each direct the computing device to write to at least a threshold number of logical sub-blocks of a respective logical block of the LV, each logical block being divided into a predefined number of equal-sized logical sub-blocks, each logical sub-block having a contiguous logical address range within the LV;

for a second subset of the set of block write commands, determining that the block write commands of the second subset each direct the computing device to write to fewer than the threshold number of logical sub-blocks of a respective logical block;

for each block write command of the first subset:

inserting a block pointer in a set of metadata of a first file of the CFS, the first file representing the LV, the set of metadata of the first file having offsets that represent logical blocks of the LV; and writing data of that block write command of the first subset to a blocks in a first region of the CFS pointed to by the inserted block pointer; and for each block write command of the second subset:

inserting a set of sub-block pointers in a set of metadata of a second file of the CFS, the second file also representing the LV, the set of metadata of the second file having offsets that represent logical sub-blocks of the LV; and writing data of that block write command of the second subset to a set of sub-blocks in a second region of the CFS pointed to by the inserted set of sub-block pointers, the second region being separate from the first region;

wherein:

inserting the block pointer in the set of metadata of the first file includes inserting the block pointer in a first inode pointer structure at an offset representing a block number within the LV;

inserting the set of sub-block pointers in the set of metadata of the second file includes inserting the set of sub-block pointers in a second inode pointer structure at offsets representing respective logical sub-block numbers within the LV, the first inode pointer structure being different than the second inode pointer structure, each containing different inodes and indirect blocks; and the first inode pointer structure and the second inode pointer structure both represent a same addressable range of the LV.

* * * * *